United States Patent [19]
Millikan et al.

[11] Patent Number: 5,883,684
[45] Date of Patent: Mar. 16, 1999

[54] DIFFUSIVELY REFLECTING SHIELD OPTICALLY, COUPLED TO BACKLIT LIGHTGUIDE, CONTAINING LED'S COMPLETELY SURROUNDED BY THE SHIELD

[75] Inventors: Bart D. Millikan, Gilbert; Michael G. Petera, Tempe, both of Ariz.

[73] Assignee: Three-Five Systems, Inc., Tempe, Ariz.

[21] Appl. No.: 878,899

[22] Filed: Jun. 19, 1997

[51] Int. Cl.$^6$ .......................... G02F 1/1335; G01D 11/28; F21V 7/04
[52] U.S. Cl. ................... 349/65; 349/71; 362/26; 362/27; 362/31
[58] Field of Search .......................... 349/65, 71; 362/26, 362/27, 31

[56] References Cited

U.S. PATENT DOCUMENTS

| | | | |
|---|---|---|---|
| 3,864,905 | 2/1975 | Richardson | 428/1 |
| 4,043,636 | 8/1977 | Eberhardt et al. | 350/345 |
| 4,573,766 | 3/1986 | Bournay, Jr. et al. | 349/65 |
| 4,630,895 | 12/1986 | Abdala, Jr. et al. | 349/65 |
| 4,915,478 | 4/1990 | Lenko et al. | 349/65 |
| 5,262,928 | 11/1993 | Kashima et al. | 349/65 |
| 5,378,298 | 1/1995 | Williams et al. | 156/275.5 |
| 5,392,199 | 2/1995 | Kashima et al. | 349/65 |
| 5,461,547 | 10/1995 | Ciupke et al. | 362/31 |
| 5,513,288 | 4/1996 | Mayer | 385/30 |
| 5,600,455 | 2/1997 | Ishikawa et al. | 349/65 |
| 5,666,172 | 9/1997 | Ida et al. | 349/58 |

Primary Examiner—William L. Sikes
Assistant Examiner—Kari Horney
Attorney, Agent, or Firm—John D. Titus; Bryan Cave LLP

[57] ABSTRACT

An LCD backlight (30) comprises generally rectangular parallelepiped light guide (36) with an exit aperture (31) that is smaller than the surface area light guide (36) and illuminates a LCD (49). The light guide is illuminated by a plurality of Light Emitting Diodes (LED) dies (32) disposed along at least one edge of the light guide. A translucent fluorescent film (40) is disposed immediately above the exit aperture to diffuse the light exiting the exit aperture and also the change in the dominant wavelengths. Further, the light guide (36), the LEDs (32), fluorescent film (40), and additional light redirecting layers (42 and 44) are completely surrounded by and optically coupled to a diffusively reflective film (50), which covers the back surface, the edges, and the front surface of the light guide except for the exit aperture. This diffusively reflective shielding is covered by a conventional reflective material layer (51) to ensure no light escapes the backlight except through the exit aperture.

9 Claims, 3 Drawing Sheets

DIFFUSIVELY REFLECTING SHIELD OPTICALLY, COUPLED TO BACKLIT LIGHTGUIDE, CONTAINING LED'S COMPLETELY SURROUNDED BY THE SHIELD

BACKGROUND OF THE INVENTION

This invention relates to backlighting apparatus such as are used for backlighting Liquid Crystal Displays. Liquid Crystal Displays (LCD's) are commonly used in portable televisions, portable computers, and cellular phones to display information to the user. For the purposes of this disclosure, an LCD can be considered to act as a light valve, which allows transmission of light in one state and blocks transmission of light in a second state. When used as a high resolution information display, an LCD is typically arranged in a dot-matrix configuration with independently addressable pixels. Each individual pixel is controlled to selectively modulate light from a backlight (transmissive mode), from a reflector (reflective mode), or from a combination of the two (transflective mode). Backlighting the LCD in some form is the most popular method of providing a source of light for such displays because backlighting the LCD allows full function in low ambient light conditions and also provides for improved contrast ratios. Because conventional monochrome transmissive dot-matrix LCD's are only approximately 40% transmissive and color dot-matrix LCD's are only approximately 6% transmissive, relatively large amounts of light are necessary to provide a visible display. The backlight must provide a substantially uniform distribution of light over the entire display in order to prevent undesirable dark spots and, where the LCD is used in portable equipment, power consumption and size must be minimized.

U.S. Pat. No. 5,050,946 (the '946 patent) discusses several conventional backlight apparatus including a light curtain system, in which light from a light source passes directly through a variable density translucent blocking layer to backlight a display. The '946 patent also discusses several conventional edge-lit light guides, including a design incorporating a flat internally diffusive light guide; a flat light guide having a diffusive front surface and a specular back reflector; and a double-wedge shaped light guide having a diffusively reflective back surface. As discussed in the '946 patent, the light guide designs are generally thinner than the light curtain designs but, because of the need to turn the light ninety degrees they are also generally less efficient than a light curtain. The light curtain, on the other hand, is generally too thick to be used as a backlight in portable equipment such as computers or cellular telephones. The '946 patent addresses the efficiency problems inherent in light guide designs by proposing a light guide having a piecewise linear double wedge-shape with a preferably specular back reflector. The light source of the '946 invention is coupled to the edge of the light guide using an index-matching material such as silicon oil, epoxy, or a polymeric material.

U.S. Pat. No. 5,461,547 discloses a thin, preferably 1 millimeter thick, light guide having a plurality of v-shaped grooves extending across the back surface of the light guide. The v-shaped grooves act as quasi-specular reflectors to reflect light entering the light guide toward the front surface.

U.S. Pat. No. 5,440,197 to Gleckman (the '197 patent) discloses an LCD backlight comprising a reflective cavity having an exit aperture. The backlight approximates an integrating sphere in that the area of the aperture from which the light escapes the cavity to illuminate the LCD display is substantially less than the total surface area of the Lambertian reflecting cavity.

In each of the foregoing light guide designs, precise geometric patterns are introduced in an effort to increase light output efficiency. Yet, in each case the light emitting aperture of the light guide is substantially equal to the cross section of the light guide itself. Thus, none of the prior art light guides have any of the light enhancing characteristics of an integrating sphere. The invention disclosed in the '197 patent approximates an integrating sphere, but does so using a relatively thick housing having a hollow cavity.

The inventors of the present invention have determined that in order for dot matrix LCDs to perform adequately in portable hand-held equipment such as cellular telephones, the backlight must be no more than 2.5 millimeters thick, must be capable of providing at least 300 foot-Lamberts of illumination with a contrast ratio (defined as the difference between the light intensity at the brightest area of the display and the light intensity at the darkest area of the display) of 1.6:1 or less, and must consume no more than 400 milliwatts of power. The prior art light guides could meet the thickness requirement, but at the specified thickness would not meet the combined light output uniformity and power consumption requirements. The quasi-integrating sphere disclosed in the '197 patent could meet the light output requirements, but would not meet the thickness or power requirements.

SUMMARY OF THE INVENTION

The present invention meets the foregoing requirements by providing a solid light integrating volume with an exit aperture that is smaller than the surface area of the solid integrating volume. The present invention comprises a generally rectangular parallelepiped light guide. The light guide is illuminated by a plurality of Light Emitting Diode (LED) dies disposed along at least one edge of the light guide. The light guide and LEDs are surrounded by, and optically coupled to a diffusively reflective film, which covers the back surface, the edges, and the front surface of the light guide except for the exit aperture. According to an embodiment of the present invention, a translucent fluorescent film is disposed immediately above the exit aperture to diffuse the light exiting the exit aperture and also the change in the dominant wavelengths. The fluorescent film also serves to diffuse and change the dominant wavelength of the ambient light reflected from the backlight assembly operating in ambient mode. Additionally, one or more light redirecting layers may be disposed above the fluorescent film to enhance the brightness of the light guide output within the desired viewing angle.

BRIEF DESCRIPTION OF THE DRAWINGS

The present invention will be better understood from a reading of the following detailed description, taken in conjunction with the accompanying drawings in which like references designate like elements and, in which.

DETAILED DESCRIPTION

Figure 1:
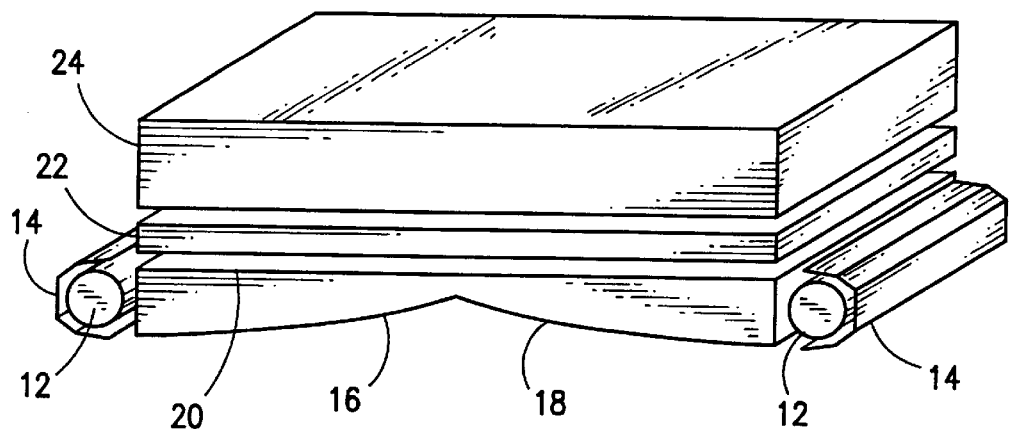
FIG. 1 is a perspective view of an LCD backlight of the prior art.

The drawing figures are intended to illustrate the general manner of construction and are not to scale. In the description and in the claims the terms left, right, front and back and the like are used for descriptive purposes. However, it is understood that the embodiment of the invention described herein is capable of operation in other orientations than are shown and the terms so used are only for the purpose of describing relative positions and are interchangeable under appropriate circumstances.

FIG. 1 generally discloses a conventional light-pipe apparatus used to backlight an LCD, for example in a portable notebook computer. Two linear cold cathode fluorescent lamps 12 are the basic light source for the system. White reflectors 14 are positioned around the lamps to reflect light from the lamps toward the light guide 16. The light guide 16 comprises a substantially transparent polymer such as polymethyl methacrylate (LUCITE) or polycarbonate (LEXAN) having an index of refraction ("n"). The transparent polymer is formed into a double wedge cross section. The bottom surface 18 of the light guide is typically a diffuse surface with the front surface 20 being a clear or specular surface. The wedge shape of the bottom surface 18 causes light from lamps 12 to reflect between the back surface 18 and the front surface 20 with a periodically decreasing angle until the light reaches the critical angle of the polymer (arcsin 1/n) and exits. The wedge shape may be straight sided or, as shown in FIG. 1, may be a quadratic curve. The wedge shape is intended to produce a more uniform distribution of light at the front surface 20 by reflecting out more incident light near the center of the light guide, where the light intensity is least. A transparent diffuser 22 is typically interposed between light guide 16 and LCD display 24 to further even out the intensity of the light backlighting the display. One significant drawback in the aforementioned backlight of the prior art, however, is the power consumption and size of the cold cathode lamps, particularly in very small displays such as those intended for use in cellular telephones. Similar power consumption drawbacks are inherent in any backlight incorporating fluorescent, incandescent or electroluminescent illumination.

Figure 2:
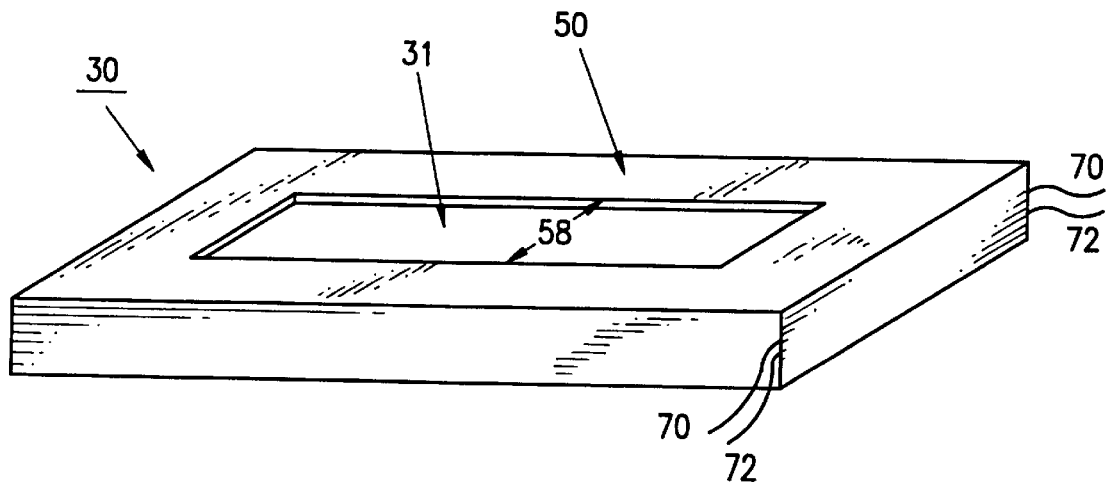
FIG. 2 is a perspective view of a backlight system incorporating features of the present invention.

A backlight system 30 incorporating features of the present invention is shown in FIG. 2. Backlight system 30 comprises backlight assembly 31 and shielding 50 which covers backlight assembly 31 except for an exit aperture 58 as described below. Shielding 50 comprises a diffusive-reflective film such as a self adhering diffusive-reflective film available from W.L. Gore and Associates, Inc., sold under the trademark DRP. DRP has a reflectance of >99.6% over wavelengths of 0.3 to 0.7 $\mu$m with essentially Lambertian light distribution. Alternatively, shielding 50 may comprise a virgin white unsintered polytetrafluoroethylene (TEFLON) tape such as that ordinarily used to coat tapered-seal thread fittings. The polytetrafluoroethylene tape is bonded to backlight assembly 31 using an index matching adhesive as discussed more fully hereinafter and followed by an aluminized mylar shell.

Figure 3:
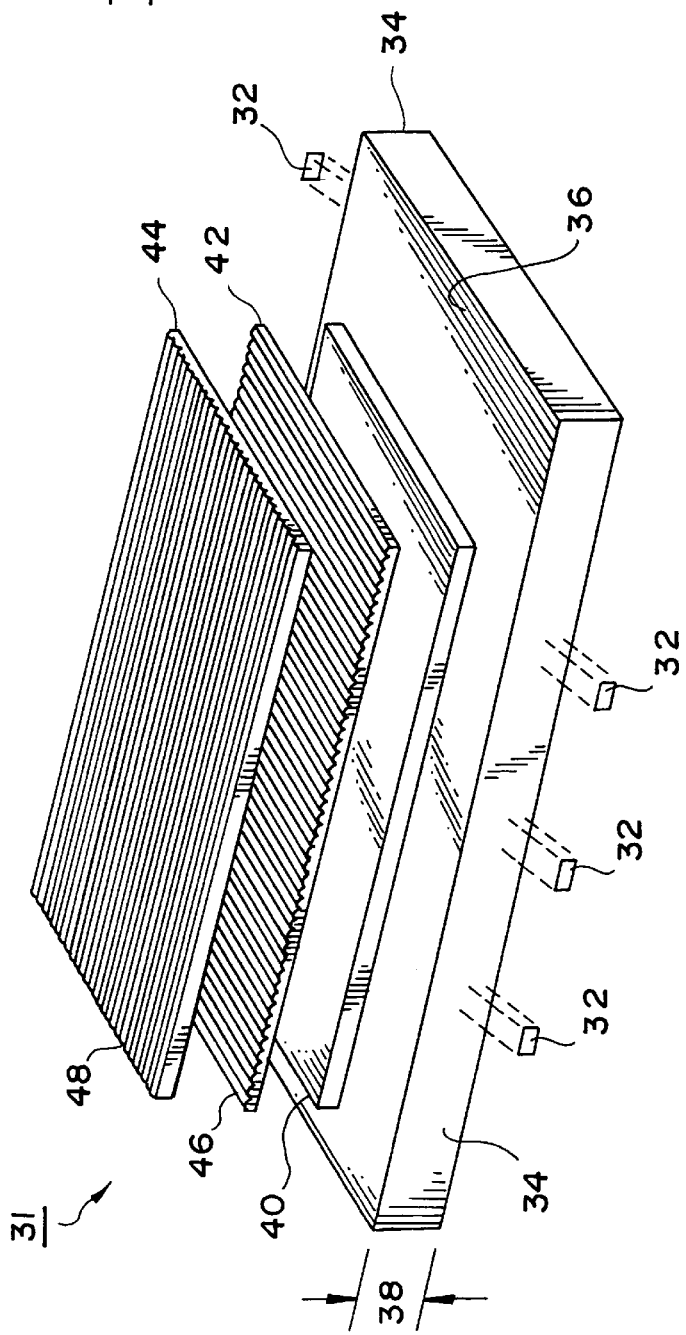
FIG. 3 is a partial exploded view of the backlight system of FIG. 2.

FIG. 3 is an exploded view of backlight assembly 31. As shown in FIG. 3, backlight assembly 31 includes a light guide 36, which comprises a generally rectangular parallelepiped composed of a transparent material such as glass, polymethyl methacrylate, polystyrene, styrene-acrylonitrile, polycarbonate, or other stable transparent polymers. Light guide 36 has a thickness dimension 38 of less than 2.5 millimeters, preferably about 0.8 to 1.4 millimeters, such that the entire backlight system 30 is approximately 2 millimeters at its maximum thickness. Light guide 36 is completely enclosed within shielding 50, except for exit aperture 58 in the shielding 50 centered in the front surface of light guide 36. Shielding 50 and light guide 36 cooperate to define a solid light integrating volume defined by the volume enclosed by shielding 50. Exit aperture 58 is smaller than the front surface area of light guide 36, typically from 50% to 85%, and preferably about 75% as large as the surface area of light guide 36. The aperture ratio, which as used herein is defined as the area of the exit aperture to the total reflecting surface of the volume enclosed by the shielding, is typically from 0.25 to 0.67 and is preferably about 0.6.

A plurality of bare light emitting diode (LED) dies 32 are disposed along opposite edges 34 of light guide 36 to provide light energy to the light pipe. In the illustrative embodiment, LEDs 32 are Showa Denka model orange-amber SOD 352s having a light output of 30 mcd and a dominant wavelength of 594 $\mu$m. To improve transmittance between LED dies 32 and light guide 36, edges 34 are first polished using an abrasive, and then solvent polished using a commercially available polycarbonate cement consisting of a mixture of tetrahydrofuran and dichloromethane. To further improve transmittance between LED dies and light guide 36, LEDs 32 are optically coupled to light guide 36 using an index-matching epoxy.

A translucent fluorescent film 40 is positioned above the light guide 36. Fluorescent film 40 acts as a light diffusing material to enhance the uniformity of the light distribution exiting aperture 58. Fluorescent film 40 also acts as a fluorescent material to absorb light energy having various lower wavelengths and re-radiate the energy as light in a predetermined higher wavelength. Use of a fluorescent film provides a highly efficient means for providing colored backlighting as opposed to use of separate diffusers and color filters as in the prior art. Moreover, where multiple colors are required to backlight different sections of a display, a single fluorescent film 40 can be segmented to provide a diffuse multi-colored backlighting. For example, where orange-amber LEDs 32 provide the light source, the light from LEDs 32 can be converted from orange-amber to deep-red in one region of the display while simultaneously being converted to red-orange in a separate region of the display, without the additional cost and power consumption necessitated by additional colored LEDs. Moreover, by utilizing high frequency emitters such as GaN die, nearly the entire visible spectrum can be obtained. Moreover, by incorporating a fluorescent film between the backlight and the LCD, ambient light such as from an overhead light or sunshine is absorbed into the florescent medium and re-emitted, thereby creating a daylight readable LCD.

Complementary light redirecting layers 42 and 44 reduce the substantially Lambertian light distribution emanating from fluorescent film 40 and redirect the light into a narrower, hence brighter, field of view. First light redirecting layer 42 comprises a thin transparent film composed of a modified acrylic resin having an upper surface comprising a plurality of repeating parallel prisms 46. Preferably, for an LCD with an acceptance cone of ±40 both horizontal and vertical, the repeating parallel prisms 46 each have a nominal included angle of 90 degrees and repeat approximately every 50 $\mu$m. A film meeting the foregoing criteria is available from 3M corporation and is sold under the trade name Brightness Enhancement Film (BEF) II. Second light reflecting layer 44 comprises a second layer of thin transparent film having repeating parallel prisms 48, identical to prisms 46, except that prisms 48 in second redirecting layer 44 are oriented 90 degrees to the orientation of the prisms 46 in first redirecting layer 42. Thus oriented, redirecting layers 42 and 44 provide approximately a 2 to 1 gain in brightness within a viewing cone of ±40 degrees normal to the plane of the front surface of the light guide.

Figure 4:
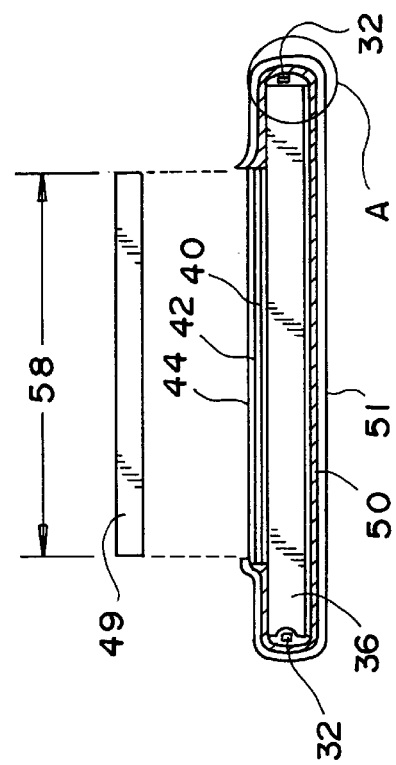
FIG. 4 is a cross section of the backlight system of FIGS. 2 and 3.

With reference to FIG. 4, as discussed above, backlight assembly 31 comprises light guide 36, fluorescent film 40 and light redirecting layers 42 and 44, which are completely covered (exclusive of aperture 58) by diffusive-reflective shielding 50. A conventional silvered or aluminized polyester tape or other reflective material 51, in turn, covers the diffusive-reflective shielding 50, to ensure no light escapes backlight assembly 31 except through exit aperture 58. Light emanating from exit aperture 58 is typically used to illuminate the back of a transmissive display, such as Liquid Crystal Display 49. Accordingly, aperture 58 is preferably sized to conform to the display being backlit. In the illustrative embodiment, which is particularly suited for a cellular telephone display, the light guide 36 is made of a polycarbonate sheet having surface dimensions of 24 millimeters by 40 millimeters and a thickness of 1 millimeter. Exit aperture 58 is 20 millimeters by 36 millimeters, which is approximately 75% of the surface dimension of light guide 26.

Figure 5:
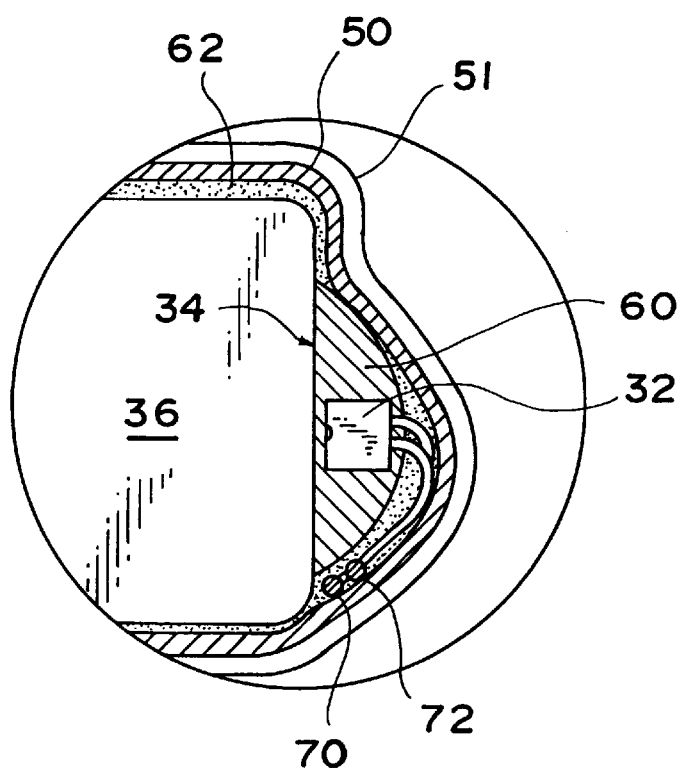
FIG. 5 is a partial enlarged view of the backlight system of FIGS. 2–4.

FIG. 5 is an enlarged view of the region indicated by reference "A" in FIG. 4 showing details of the optical coupling of LED die 32 to light guide 36. As shown in FIG. 5, once surface 34 of light guide 36 is polished, a quantity of adhesive 60 having an index of refraction equal to or greater than the index of refraction of light guide 36 is used to bond LED die 32 to light guide 36. In the illustrative embodiment, adhesive 60 comprises a photopolymer available from Norland Products of New Brunswick N.J. sold under the name Norland Optical Adhesive 68. By optically coupling LED die 32 to light guide 36, losses caused by reflection at surface 34 are minimized.

Figure 6:
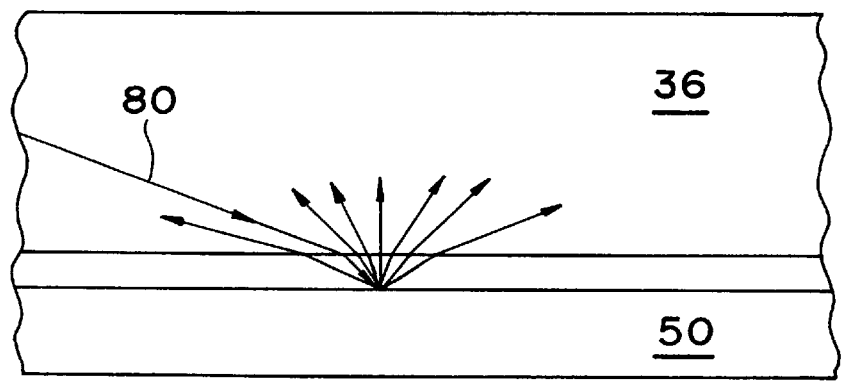
FIG. 6 is a schematic depicting a ray of light refracted toward a diffusively reflective surface.

Leads 70 and 72 from LED die 32 are routed along the edge 34 of light guide 36 to exit at a corner of light guide 36. To further minimize losses, a quantity of a second adhesive 62 having an index of refraction that is equal to or greater than the index of refraction of light guide 36, is used to bond shielding 50 to light guide 36. As illustrated in FIG. 6, by using an optical adhesive to couple the light guide and shielding, a "solid" integrating cavity is created which maximizes the microscopic diffuse reflective surface textures allowing the rays to transmit through a seemingly solid cavity only to reflect diffusely in a substantially Lambertian distribution at the microscopic interface between the reflective shielding and the lightguide composite. By refracting the light toward the diffuse reflector 50, the optical path of a substantial portion of the light is reduced, thereby further improving the efficiency of light guide 36.

With reference to FIG. 4, although in the illustrative embodiment edges 34 are polished flat, recesses or grooves 28 in edges 34 may be provided to permit the conformal reflector to wrap around light guide 36 with minimum distortion and to provide better optical coupling between light guide 36 and LEDs 32.

Although certain preferred embodiments and methods have been disclosed herein, it will be apparent from the foregoing disclosure to those skilled in the art that variations and modifications of such embodiments and methods may be made without departing from the spirit and scope of the invention. Accordingly, it is intended that the invention shall be limited only to the extent required by the appended claims and the rules and principles of applicable law.

What is claimed is:

1. Apparatus for backlighting a liquid crystal display, comprising:

a light guide assembly, said light guide assembly comprising:
a light guide comprising a generally rectangular parallelepiped of a transparent material having a first index of refraction, said light guide having a planar front surface having a first area, said light guide further comprising first and second edges;
a plurality of light emitting diodes disposed adjacent said first edge for providing light to said light guide;
a translucent film disposed above said front surface for diffusing light exiting therefrom; and
a first light redirecting film disposed above said translucent film, said first light redirecting film having a surface composed of a plurality of parallel repeating prisms oriented along a first axis in the plane of said first light redirecting film; and
a shield disposed at least partly around said light guide assembly and completely around said diodes to form a substantially continuous reflector, said shield defining an exit aperture having a second area, said second area having a dimension smaller than said first area, said shield and said light guide cooperating to provide a light integrating volume having a substantially Lambertian light source at said exit aperture.

2. The apparatus of claim 1, further comprising:
a second light redirecting film disposed above said first light redirecting film, said second light redirecting film having a surface composed of a plurality of parallel repeating prisms oriented along a second axis in the plane of said second light redirecting film, said second axis being orthogonal to said first axis.

3. The apparatus of claim 1, wherein:
said shield is optically coupled to said light guide with an optically coupling material.

4. The apparatus of claim 3, wherein:
said optically coupling material comprises a photopolymeric adhesive.

5. The apparatus of claim 1, wherein:
said light guide comprises a rectangular parallelepiped having a thickness of no more than 2.5 millimeters.

6. The apparatus of claim 1, wherein:
said first and second edges comprise grooves sized to receive said light emitting diodes flush with the surface of said first edge.

7. The apparatus of claim 1, wherein:
said translucent film includes a fluorescent material adapted to absorb light energy exiting said light guide and re-radiating said light energy at a predetermined distribution of wavelengths.

8. Apparatus for backlighting a liquid crystal display, comprising:
a light guide assembly having a front surface and a back surface, said light guide assembly comprising:
a light guide comprising a generally rectangular parallelepiped having a planar front surface having a first area, said light guide further comprising first and second edges;
a plurality of light emitting diodes disposed adjacent said first and second edges for providing light to said light guide, said plurality of light emitting diodes having a total power consumption of less than 400 milliwatts;

a translucent film juxtaposed said front surface for diffusing light exiting therefrom; and a first light redirecting film juxtaposed said translucent film, said first light redirecting film having a surface composed of a plurality of parallel repeating prisms oriented along a first axis in the plane of said first light redirecting film;

a shield disposed at least partly around said light guide assembly and completely around said diodes, said shield comprising a diffusively reflective surface defining an exit aperture at said front surface of said light guide assembly, said shield and said light guide assembly cooperating to provide a substantially Lambertian light source at said exit aperture having an output of at least 300 foot-Lamberts and an illuminance uniformity of no more than 1.6 to 1.

9. A display apparatus comprising:

A liquid crystal display panel, said liquid crystal display panel being at least partially transmissive such that at least a portion of illumination is transmitted through said liquid crystal display panel;

a light guide assembly, said light guide assembly comprising:

a light guide comprising a sheet of transparent material having a first index of refraction, said light guide having a planar front surface having a first area, said light guide further comprising first and second edges;

a plurality of light emitting diodes disposed adjacent said first edge for providing light to said light guide;

a first light redirecting film disposed above said light guide, said first light redirecting film having a surface composed of a plurality of parallel repeating prisms oriented along a first axis in the plane of said first light redirecting film;

a shield disposed around said light guide assembly to form a substantially continuous reflector, said shield having an defining an exit aperture having a second area, said second area having a dimension smaller than said first area, said shield and said light guide cooperating to provide a light integrating volume having a substantially Lambertian light source at said exit aperture; and an adhesive layer disposed between said light guide and said shield, said adhesive adapted to optically couple said shield to said light guide, said adhesive layer having an index of refraction no less than said first index of refraction.

* * * * *